United States Patent
Shinn et al.

(10) Patent No.: US 7,454,438 B2
(45) Date of Patent: Nov. 18, 2008

(54) SYSTEM AND METHODS FOR DYNAMIC QUERYING

(75) Inventors: Matthew Shinn, San Francisco, CA (US); Seth White, San Francisco, CA (US); Robert Woollen, San Francisco, CA (US)

(73) Assignee: BEA Systems, Inc., San Jose, CA (US)

( * ) Notice: Subject to any disclaimer, the term of this patent is extended or adjusted under 35 U.S.C. 154(b) by 0 days.

(21) Appl. No.: 11/393,052

(22) Filed: Mar. 30, 2006

(65) Prior Publication Data

US 2006/0173835 A1  Aug. 3, 2006

Related U.S. Application Data

(62) Division of application No. 10/341,107, filed on Jan. 13, 2003.

(60) Provisional application No. 60/349,432, filed on Jan. 18, 2002.

(51) Int. Cl.
*G06F 7/00* (2006.01)
*G06F 17/00* (2006.01)
*G06F 3/00* (2006.01)

(52) U.S. Cl. .................. 707/103 R; 707/3; 719/310

(58) Field of Classification Search .......... 707/3, 707/103 R; 717/108; 719/310, 311
See application file for complete search history.

(56) References Cited

U.S. PATENT DOCUMENTS

| | | | |
|---|---|---|---|
| 5,499,371 A | 3/1996 | Henniger et al. | |
| 6,199,195 B1 * | 3/2001 | Goodwin et al. | 717/104 |
| 6,266,666 B1 | 7/2001 | Ireland et al. | |
| 6,308,179 B1 | 10/2001 | Petersen et al. | |
| 6,442,541 B1 | 8/2002 | Clark et al. | |
| 6,466,933 B1 | 10/2002 | Huang et al. | |
| 6,505,200 B1 | 1/2003 | Ims et al. | |
| 6,687,702 B2 | 2/2004 | Vaitheeswaran et al. | |

(Continued)

FOREIGN PATENT DOCUMENTS

GB  2 339 036  1/2000

OTHER PUBLICATIONS

International Search Report for PCT/US03/01211 dated Apr. 14, 2003 (2 pages).

(Continued)

*Primary Examiner*—Etienne P LeRoux
(74) *Attorney, Agent, or Firm*—Fliesler Meyer LLP

(57) ABSTRACT

A user can generate queries dynamically at runtime without having to redeploy the appropriate EJB or hard-code the query into the user application. A properties object can be generated to accept the query settings from the user. These settings can be extracted at runtime when the appropriate finder method is invoked, such that the desired query statement, such as a SQL statement, can be generated and executed against the database.

This description is not intended to be a complete description of, or limit the scope of, the invention. Other features, aspects, and objects of the invention can be obtained from a review of the specification, the figures, and the claims.

14 Claims, 2 Drawing Sheets

U.S. PATENT DOCUMENTS

| | | | |
|---|---|---|---|
| 6,694,328 B1 * | 2/2004 | Bennett | 707/103 R |
| 6,748,373 B2 | 6/2004 | Messinger et al. | |
| 6,760,719 B1 * | 7/2004 | Hanson et al. | 707/3 |
| 6,760,812 B1 | 7/2004 | Degenaro et al. | |
| 6,823,329 B2 | 11/2004 | Kirk et al. | |
| 6,836,889 B1 * | 12/2004 | Chan et al. | 719/310 |
| 6,971,085 B1 | 11/2005 | Alcorn | |
| 6,996,565 B2 * | 2/2006 | Skufca et al. | 707/10 |
| 6,999,956 B2 * | 2/2006 | Mullins | 707/2 |
| 2003/0163460 A1 | 8/2003 | Shinn et al. | |

OTHER PUBLICATIONS

International Search Report for PCT/US03/04948 dated Feb. 5, 2003 (3 pages).

Crechert et al., "Performance and Scalability of EJB Application," Proceedings of the 17$^{th}$ ACM Conference on Object-Oriented Programming, Systems, Languages and Applications, Nov. 2002, vol. 37, Issue 11, ACM Press, pp. 246-250.

* cited by examiner

SYSTEM AND METHODS FOR DYNAMIC QUERYING

CLAIM OF PRIORITY

This application is a divisional application of U.S. patent application Ser. No. 10/341,107, entitled SYSTEMS AND METHODS FOR DYNAMIC QUERYING, inventors Matt Shinn, Seth White, and Rob Woollen, filed Jan. 13, 2003, which claims priority to U.S. Provisional Patent Application No. 60/349,432, filed Jan. 18, 2002, entitled SYSTEM AND METHOD FOR DYNAMIC QUERYING, both of which are incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The present invention relates to executing queries against a database.

BACKGROUND

The Enterprise JavaBean (EJB) specification, published by Sun Microsystems, Inc. of Palo Alto, Calif., describes ways in which a user can execute queries against a database, as well as ways in which a user can communicate queries to an EJB container. Presently, the EJB 2.0 specification forces users to hard-code finder queries into a deployment descriptor for an EJB. A user develops a query before deploying the EJB. Once the EJB is deployed, the user is able to execute the query. A problem exists with this approach, however, in that it is necessary to redeploy the EJB every time the user wishes to run a new query.

BRIEF SUMMARY

Systems and methods in accordance with one embodiment of the present invention can allow a user to dynamically generate a query to be executed against a database. A properties object can be generated that holds settings for the query, which can be specified by a user at runtime. When the query is to be executed, the user or application can invoke an appropriate finder method. The server receiving the call from the finder method can extract the user-specified settings from the properties object and parse the finder method in order to generate a query statement. The server can then execute the query statement on the database and return the appropriate results. The generating of the properties object and the query statement can happen at runtime.

Other features, aspects, and objects of the invention can be obtained from a review of the specification, the figures, and the claims.

DETAILED DESCRIPTION

Systems and methods in accordance with one embodiment of the present invention can allow a user to define a query programmatically rather than defining the query statically. Static queries are defined, for example, by hard-coding the static query into the deployment descriptor for an EJB. Programmatic queries, or "dynamic queries", allow users to construct and execute queries in their application code. This can provide several benefits over static queries which utilize static finder methods.

One such benefit is the ability to create and execute new queries without having to update and redeploy an EJB. When deploying an EJB with static queries, each query is read and parsed in order to generate the SQL to be sent to the database. Finder methods can be utilized in executing the query, which can be defined in the home interface of an entity bean. An example of a finder method is findByPrimaryKey( ), which can accept an instance of a primary key and return an instance of that entity type (or throw an exception). Additional finder methods can be defined in local home or remote home interfaces, with each finder method being associated with a query in the deployment descriptor. With dynamic queries, however, the query and corresponding SQL can be generated at runtime.

Another benefit is that the size of an EJB deployment descriptor is reduced. Since the finder queries can be created dynamically, they do not have to be statically defined in the deployment descriptor. For some applications this approach may be a little slower, but the added flexibility will outweigh the slight hit in performance for many users.

Figure 1:
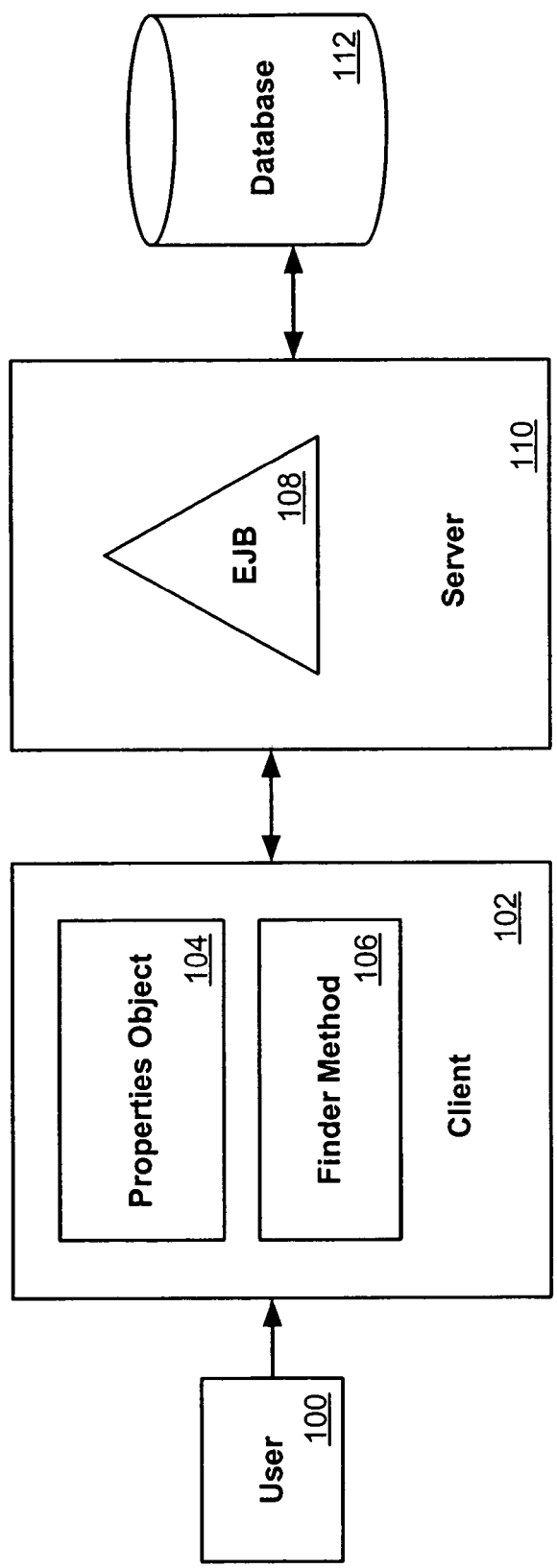
FIG. 1 is a diagram of a system in accordance with one embodiment of the present invention.

One system and method for implementing dynamic queries utilizes the generation of a class such as an ejbHome class. Such a class can be used to implement an extra interface with a method that can execute the query. As shown in FIG. 1, when a user 100 wants to execute a query against a database 112 at runtime, an object such as a Java properties object 104 can be generated that can be populated with the settings for the finder method 106, such as a container-managed or bean-managed finder method. The finder method 106 can then be invoked on the query home of the appropriate EJB 108, which can be stored on a server 110 or EJB container in communication with, and capable of executing SQL queries against, a database 112. Once the call makes it into the server 110, the properties object 104 can be inspected and the user settings extracted. The finder method 106 can be parsed and the SQL query statement generated that is to be sent to the database 112. The query is executed and, depending on the user settings, the use of the results can be determined. One possible result of such a query is a collection of EJBs. Another possible result is a number of values or fields on certain EJBs that match the query.

Figure 2:
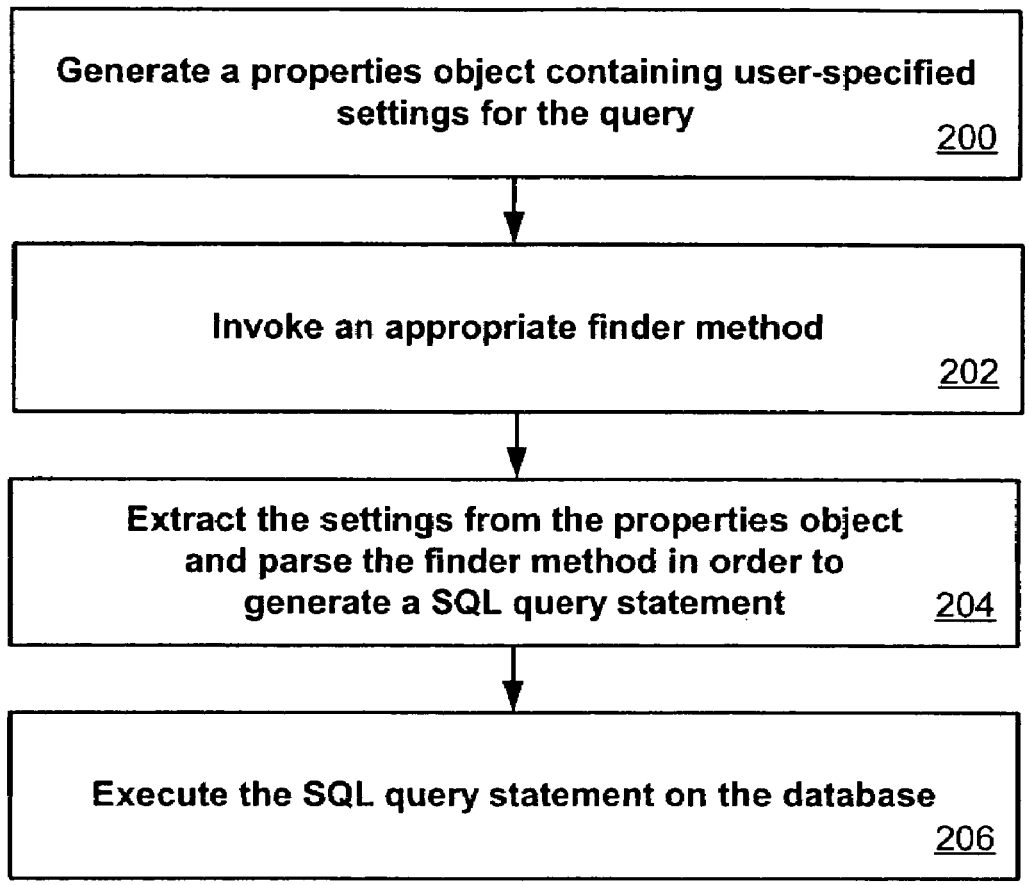
FIG. 2 is a flowchart showing the steps of a method that can be used with the system of FIG. 1.

A method that can be used in accordance with the system of FIG. 1 is shown in the flowchart of FIG. 2. In the method, a properties object is generated that contains user-specified settings for the query or the finder method, as can be implemented through a user interface of an ejbHome class 200. The appropriate finder method is invoked when the user or application wishes to execute the query 202. The settings are extracted from the properties object and the finder method is parsed in order to generate the appropriate SQL query statement, although other database or data source querying language statements may be generated by the method 204. The SQL query statement is then executed against the database 206.

One embodiment can be implemented through a simple API. To enable the use of dynamic queries, users can add an element to their deployment descriptor, such as:

<!ELEMENT enable-dynamic-queries (#PCDATA)>

The enable-dynamic-queries element can be a sub-element of a descriptor such as entity-descriptor. The value of enable-dynamic-queries can be either "true" or "false" in this embodiment. Invoking a dynamic query when dynamic queries have not been enabled can result in an exception being thrown, such as java.rmi.AccessException or javax.ejb.AccessLocalException, depending on whether it was invoked from a Remote or Local interface.

A generated implementation class, such as HomeImpl that can be used for all EJB 2.0 Container-Managed Persistence (CMP) beans, can implement a new interface such as QueryHome. A QueryHome interface can declare a single method, such as:

```
public Object executeQuery(String query, Properties props)
    throws FinderException, RemoteException;
```

There can also be a local version of QueryHome which may be referred to as QueryLocalHome. The only difference between the interfaces can be the "throws" clause of the executeQuery method. The QueryLocalHome iinterface can declare a single method:

```
public Object executeQuery(String query, Properties props)
    throws FinderException, EJBException;
```

The application code can make use of this interface as follows:

```
InitialContext ic = new InitialContext( );
FooHome fh = (FooHome)ic.lookup("fooHome")'
QueryHome qh = (QueryHome)fh;
String query = "SELECT OBJECT(e) FROM EmployeeBean e WHERE e.name = 'rob' ";
Properties props = new Properties( );
props.setProperty(DynamicQuery.MAX_ELEMENTS, "10");
Collection results = (Collection)qh.executeQuery(query, props);
```

All options that can currently be specified for a static finder can be set in a Properties object passed to the executeQuery method. The Properties key for all valid options can be defined in a DynamicQuery interface. A list of some valid entries is as follows:

| Property: | Value: | Description: |
|---|---|---|
| GROUP_NAME | String | The name of the field-group whose fields are to be loaded into the cache upon execution of the query. Note that in order for this to work, a finders-load-bean or equivalent option may need to be enabled for the EJB. |
| MAX_ELEMENTS | int | The max-elements attribute is used to specify the maximum number of elements that should be returned by a multi-valued query. This option can be similar to the maxRows feature of JDBC. |
| INCLUDE_UPDATES | boolean | The include-updates tag is used to specify that updates made during the current transaction must be reflected in the result of a query. |
| SQL_SELECT_DISTINCT | boolean | Used to control whether the generated SQL 'SELECT' will contain a 'DISTINCT' qualifier. Use of the DISTINCT qualifier will cause the RDBMS to return unique rows. |
| RETURN_TYPE | String | Indicates the return type of the executeQuery method. Legal values include Collection, CursoredCollection, and ResultSet. The default value is java.util.Collection. |
| NEW_TRANSACTION | boolean | Indicates whether a new transaction should be started for the execution of the DynamicQuery |
| ISOLATION_LEVEL | String | Indicates the isolation level to be used if a new transaction is started |
| RESULT_TYPE_MAPPING | String | Indicates whether EJBObjects or EJBLocalObjects should be returned. The legal values are Local and Remote. If the query was executed on QueryHome, EJBObjects will always be returned. If the query was executed on QueryLocalHome, EJBLocalObjects will be returned by default. A result-type-mapping of Remote can be specified in this case if EJBObjects are desired. |

Ideally, dynamic queries execute nearly as fast as static queries. Dynamic queries can invariably be somewhat slower since the queries can require parsing at runtime, whereas static queries are parsed during deployment. The speed of dynamic queries can be increased, such as by extending them to take query parameters and caching the parsed query String.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

What is claimed is:

1. A computer implemented method for dynamically generating a query to be executed against a database, comprising:

enabling use of dynamic queries by setting a qualification tag "enable-dynamic-queries (#PCDATA)" to the value of true in a deployment descriptor, wherein "enable-dynamic-queries" represents an arbitrary name of an extensible markup language (XML) tag and wherein symbol "#PCDATA" represents that the qualification tag contains parsed character data that is parsed by an XML parser; deploying a bean on a server for connecting to and executing queries against the database, said bean having a bean home class that includes a finder method; generating a properties object containing settings for the query, said settings specifying one or more options for execution of the query, wherein the properties object is populated with said settings at runtime;

invoking the finder method on said bean by an application executing on a client and passing the properties object to said bean;

receiving the finder method invocation by said server and inspecting said properties object;

extracting the settings from the properties object and parsing the finder method in order to generate a query statement by the bean at runtime, such that said query statement need not be statically defined in the deployment descriptor of said bean and such that the bean is not redeployed upon execution of a new query;

executing the query statement on the database by said server; and returning a result set retrieved from the database in response to execution of the query statement by using a query home collection results method.

2. The method of claim 1, wherein:
generating a properties object occurs at runtime.

3. The method of claim 1, wherein:
extracting the settings from the properties object and parsing the finder method in order to generate a SQL query statement occurs at runtime.

4. The method of claim 1, further comprising:
allowing the user to specify the settings for the query at runtime.

5. The method of claim 1 wherein size of a deployment descriptor of the bean is reduced by generating the query dynamically.

6. The method of claim 1 wherein one of the settings used in generating the query specifies a name of a field-group whose fields are to be loaded into a cache upon execution of the query.

7. The method of claim 1 wherein one of the settings used in generating the query specifies a maximum number of elements that should be returned by a multi-valued query.

8. The method of claim 1 wherein one of the settings used in generating the query specifies whether updates made during the current transaction must be reflected in the result of the query.

9. The method of claim 1 wherein one of the settings used in generating the query specifies whether the database will return unique rows in response to the query.

10. The method of claim 1 wherein one of the settings used in generating the query specifies the return type of the finder method.

11. The method of claim 1 wherein one of the settings used in generating the query indicates whether a new transaction should be started for execution of the query.

12. The method of claim 1 wherein one of the settings used in generating the query indicates the isolation level to be used if a new transaction is started.

13. The method of claim 1 wherein one of the settings used in generating the query indicates whether EJB objects or EJB local objects should be returned.

14. The method of claim 1, wherein the speed of dynamic queries is increased by extending the dynamic queries to take query parameters and caching a parsed query string.

* * * * *

UNITED STATES PATENT AND TRADEMARK OFFICE
CERTIFICATE OF CORRECTION

PATENT NO. : 7,454,438 B2 Page 1 of 1
APPLICATION NO. : 11/393052
DATED : November 18, 2008
INVENTOR(S) : Shinn et al.

It is certified that error appears in the above-identified patent and that said Letters Patent is hereby corrected as shown below:

On the Title page, in field (54), in "Title", in column 1, line 1, delete "SYSTEM" and insert -- SYSTEMS --, therefor.

In column 1, line 1, delete "SYSTEM" and insert -- SYSTEMS --, therefor.

In column 4, line 2, delete "iinterface" and insert -- interface --, therefor.

Signed and Sealed this

Twentieth Day of April, 2010

David J. Kappos
*Director of the United States Patent and Trademark Office*